US011799942B2

(12) United States Patent
Yokomitsu

(10) Patent No.: US 11,799,942 B2
(45) Date of Patent: Oct. 24, 2023

(54) TERMINAL DEVICE AND COMMUNICATION METHOD

(71) Applicant: SHARP KABUSHIKI KAISHA, Sakai (JP)

(72) Inventor: Naoto Yokomitsu, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/752,039

(22) Filed: May 24, 2022

(65) Prior Publication Data

US 2022/0385719 A1  Dec. 1, 2022

(30) Foreign Application Priority Data

May 31, 2021 (JP) .................................. 2021-091858

(51) Int. Cl.
| | | |
|---|---|---|
| *G06F 15/16* | (2006.01) | |
| *H04L 67/02* | (2022.01) | |
| *H04L 67/146* | (2022.01) | |
| *H04L 9/08* | (2006.01) | |

(52) U.S. Cl.
CPC ............ *H04L 67/02* (2013.01); *H04L 9/0825* (2013.01); *H04L 67/146* (2013.01)

(58) Field of Classification Search
None
See application file for complete search history.

(56) References Cited

U.S. PATENT DOCUMENTS

| | | | | |
|---|---|---|---|---|
| 7,440,560 | B1 * | 10/2008 | Barry .................. | H04L 12/5692 |
| | | | | 379/201.01 |
| 11,196,712 | B1 * | 12/2021 | Norbutas ................ | H04L 43/10 |
| 11,196,833 | B1 * | 12/2021 | Norbutas ............ | H04L 63/0272 |
| 2015/0141018 | A1 * | 5/2015 | Kapoulas .............. | H04W 36/36 |
| | | | | 455/437 |
| 2016/0094686 | A1 | 3/2016 | Yasuma | |
| 2020/0008248 | A1 * | 1/2020 | Beck ...................... | H04W 76/15 |
| 2021/0266265 | A1 * | 8/2021 | Choi ....................... | H04L 47/37 |
| 2021/0409447 | A1 * | 12/2021 | Dutta ...................... | H04L 69/24 |
| 2022/0124139 | A1 * | 4/2022 | Yamagishi ............. | H04L 67/101 |
| 2022/0159433 | A1 * | 5/2022 | Flinck .................... | H04W 12/06 |
| 2022/0303331 | A1 * | 9/2022 | Svennebring ...... | H04N 21/8456 |

FOREIGN PATENT DOCUMENTS

JP        2016-072684 A        5/2016

* cited by examiner

*Primary Examiner* — Phuoc H Nguyen
(74) *Attorney, Agent, or Firm* — ScienBiziP, P.C.

(57) ABSTRACT

A terminal device including: a controller; and a communicator that performs Hyper Text Transfer Protocol (HTTP) communication with a communication destination, wherein the controller starts processes for respectively establishing a first connection for using HTTP/3 and a second connection for using HTTP/2, and proceeds with communication using the HTTP/3 through the communicator if the first connection is successfully established.

8 Claims, 13 Drawing Sheets

FIG. 3

| SERVER IDENTIFIER (IP ADDRESS/PORT, URI, PROTOCOL) | SETTING INFORMATION (LAST ACCESS TIME, OTHER SERVICES, TLS/session id, TLS/session ticket, SETTINGS FRAME CONTENT, WHETHER OR NOT SETTING IS SKIPPABLE) |
|---|---|
| (URI) https://exmample.com (PROTOCOL) h3 (PORT) 430/UDP | (LAST ACCESS DATE AND TIME) 2021-03-23T06:04:14Z (OTHER SERVICES) Alt-Svc: h2=":443"; ma=86400; Alt-Svc: h2="altsvc.example.com:443"; Alt-Svc: h3-25=":443"; ma=3600, h2=":443"; ma=3600 (TLS/session ticket) 58 f1 db cb f0 fe ea bc 00 bd 66 2d 9c 1b bb 10 96 d9 c7 46 7c ff 4c 44 7d f4 8d 04 56 6b 18 25 58 bb e1 f4 01 30 1f 03 c2 3c 57 df 4d 77 5e fd 18 1f a7 69 93 cf a8 10 93 b2 a8 6b b4 b3 b0 14 (SETTINGS FRAMES) SETTINGS_QPACK_MAX_TABLE_CAPACITY(0x01):0 SETTINGS_MAX_FIELD_SECTION_SIZE(0x06): (unlimited) SETTINGS_QPACK_BLOCKED_STREAMS(0x07): 0 SKIP_SETTINGS: 1 (IS SETTING SKIPPABLE) true |
| (URI) https://exmample.com (PROTOCOL) h2 (PORT) 430/TCP | (LAST ACCESS DATE AND TIME) 2021-03-21T12:05:23Z (OTHER SERVICES) Alt-Svc: h3=":8200"; ma=172800; (TLS/session ticket) 4e 14 f5 40 c4 fd 27 fa c4 1a 56 f3 c6 ec 3c ac 5e df 17 cb 77 92 24 6d c5 02 38 81 13 d6 78 00 d2 96 45 00 4e 8a 53 85 fe 22 86 41 c3 11 34 7e b3 3c (SETTINGS FRAMES) HEADER_TABLE_SIZE(0x01): 8192 ENABLE_PUSH(0x02): 0 MAX_CONCURRENT_STREAMS(0x03): 2048 INITIAL_WINDOW_SIZE(0x04): 65535 MAX_FRAME_SIZE(0x05): 16384 MAX_HEADER_LIST_SIZE(0x06): (infinite) SETTINGS_ENABLE_CONNECT_PROTOCOL(0x08): 0 TLS_RENEG_PERMITTED(0x10): 0x00 SETTINGS_SKIP_SETTINGS: 0 (IS SETTING SKIPPABLE) false |
| (IP ADDRESS/PORT) 100.200.100.24:3005 TCP (PROTOCOL) h2c | (LAST ACCESS DATE AND TIME) 2021-03-20T09:52:18Z (OTHER SERVICES) Alt-Svc: h2=":439"; Alt-Svc: h3=":8200"; (TLS/session ticket)  (SETTINGS FRAMES) HEADER_TABLE_SIZE(0x01): 8192 ENABLE_PUSH(0x02): 0 MAX_CONCURRENT_STREAMS(0x03): 2048 INITIAL_WINDOW_SIZE(0x04): 65535 MAX_FRAME_SIZE(0x05): 16384 MAX_HEADER_LIST_SIZE(0x06): (infinite) SETTINGS_ENABLE_CONNECT_PROTOCOL(0x08): 0 TLS_RENEG_PERMITTED(0x10): 0x00 SETTINGS_SKIP_SETTINGS: 0 (IS SETTING SKIPPABLE) true |

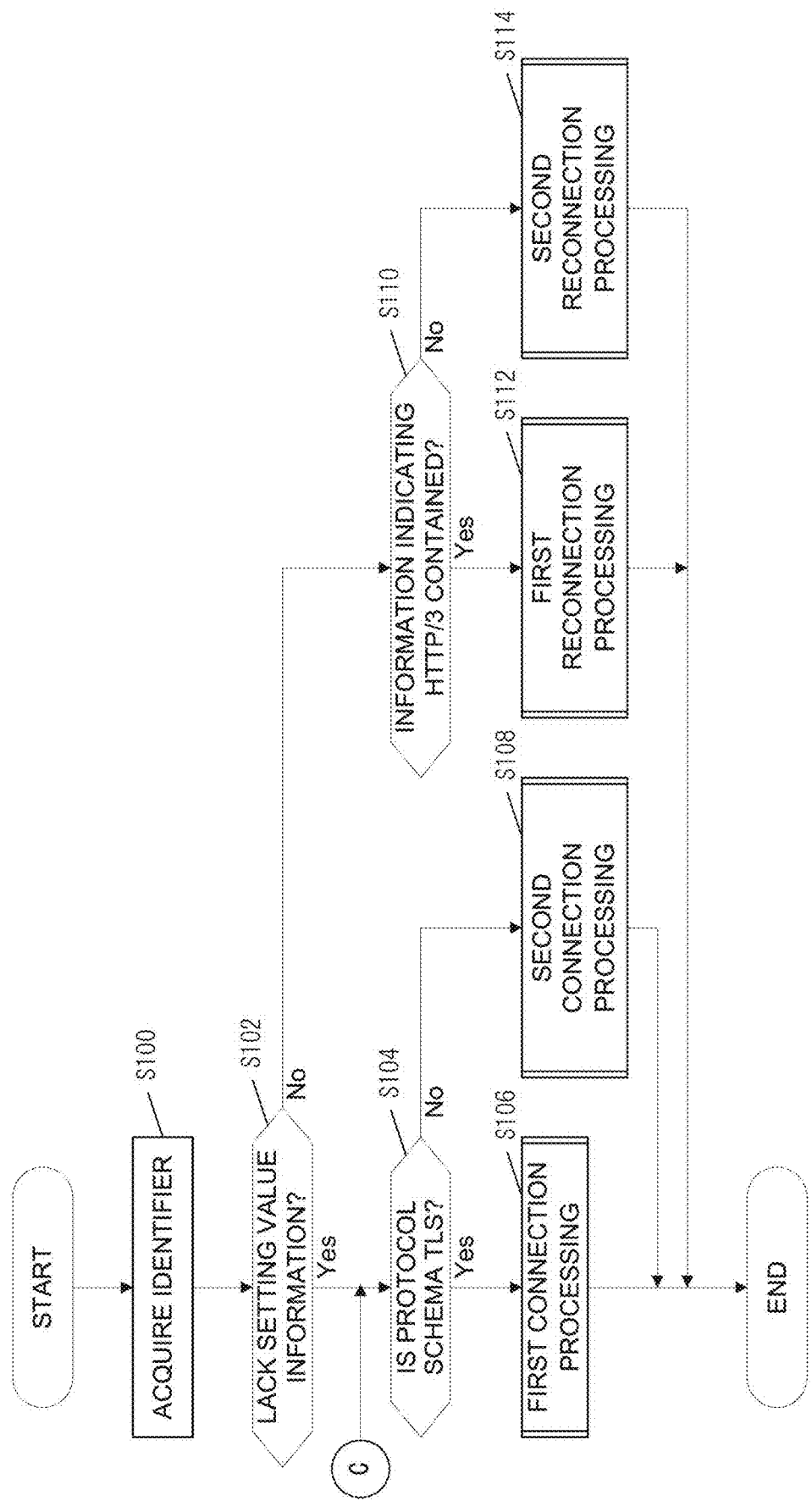

TERMINAL DEVICE AND COMMUNICATION METHOD

BACKGROUND OF THE INVENTION

Field of the Invention

The present disclosure relates to a terminal device and the like.

Description of the Background Art

Conventionally, a variety of devices are connected to a network and communicate with other devices. Some devices also appropriately select a communication protocol to use from among a plurality of communication protocols usable for the communication. Some techniques have been proposed for efficient selection of a communication protocol in such a case.

For example, a communication device has been known that determines, upon a connection destination communication device being specified, whether or not to omit a protocol switching process for switching from a first communication protocol to a second communication protocol based on whether or not the communication device contains identification information of the connection destination communication device, and upon determining to omit the switching process, transmits a connection start request using the second communication protocol to the connection destination communication device.

When a device communicates with another device, the protocol for the communication can be selectable out of a communication protocol that has been conventionally used and a new communication protocol obtained by improving the conventionally used communication protocol (for example, a communication protocol that offers improved communication speed). It is desirable that the communication source device preferentially select the new communication protocol provided that the communication destination device is compatible with the new communication protocol. However, such a conventional communication device has failed to take into consideration such a situation.

In view of the above-described problem, the present disclosure is achieved to provide a terminal device and the like that allows for communication using an appropriate communication protocol.

SUMMARY OF THE INVENTION

In order to solve the problem described above, the present disclosure provides a terminal device including: a controller; and a communicator that performs Hyper Text Transfer Protocol (HTTP) communication with a communication destination, wherein the controller starts processes for respectively establishing a first connection for using HTTP/3 and a second connection for using HTTP/2, and proceeds with communication using the HTTP/3 through the communicator if the first connection is successfully established.

The present disclosure also provides a communication method for a terminal device to perform Hyper Text Transfer Protocol (HTTP) communication, the communication method including: starting processes for respectively establishing a first connection for using HTTP/3 and a second connection for using HTTP/2; and proceeding with communication using the HTTP/3 if the first connection is successfully established by the terminal device.

The present disclosure also provides a terminal device including: a controller; and a communicator, wherein the controller starts processes for respectively establishing a first connection for using a first communication protocol having a higher communication speed and a second connection for using a second communication protocol having a lower communication speed, and proceeds with communication using the first communication protocol through the communicator if the first connection is successfully established.

According to the present disclosure, it is possible to provide a terminal device and the like that allows for communication using an appropriate communication protocol.

BRIEF DESCRIPTION OF THE DRAWINGS

FIG. 3 is a diagram for illustrating a data structure of setting value information according to the first embodiment.

FIG. 4 is a flowchart for illustrating a flow of processing to be performed by the terminal device according to the first embodiment.

DESCRIPTION OF THE PREFERRED EMBODIMENTS

The following describes embodiments for carrying out the present disclosure with reference to the drawings. The embodiments below are examples for describing the present disclosure, and the technical scope of the disclosure set forth in the claims is not limited to the description below.

1. First Embodiment

1.1 Overall Configuration

Figure 1:
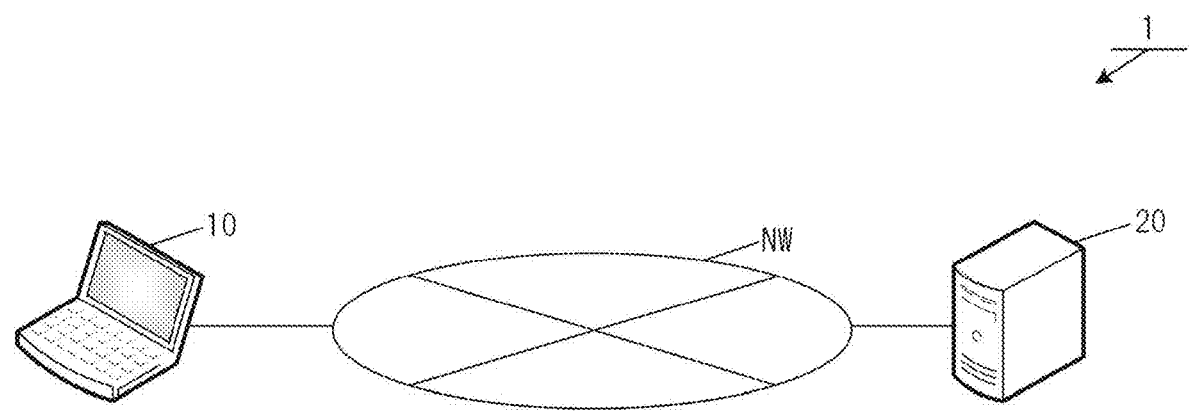
FIG. 1 is a diagram for illustrating an overall configuration of a system according to a first embodiment.

An overall configuration of a system 1 according to a first embodiment will be described with reference to FIG. 1. As illustrated in FIG. 1, the system 1 includes a terminal device 10 and a server device 20 that are communicatively connected to each other via a network NW. The network NW may be an external network (wide area network (WAN)) such as the Internet or an internal network such as a local area network (LAN). Two devices described as "being connected" in the present embodiment mean that the two devices are in a state ready for communication therebetween.

The terminal device 10 is an information processing device that is used by a user. The terminal device 10 includes, for example, a computer (information processing device) such as a smartphone, a tablet computer, or a personal computer (PC).

The server device 20 is an information processing device that provides a predetermined service. The server device 20 includes a computer (information processing device) such as a PC or a server. The server device 20 may include a plurality of information processing devices or may include a virtual server implemented on an information processing device.

1.2 Functional Configuration

1.2.1 Terminal Device

Figure 2:
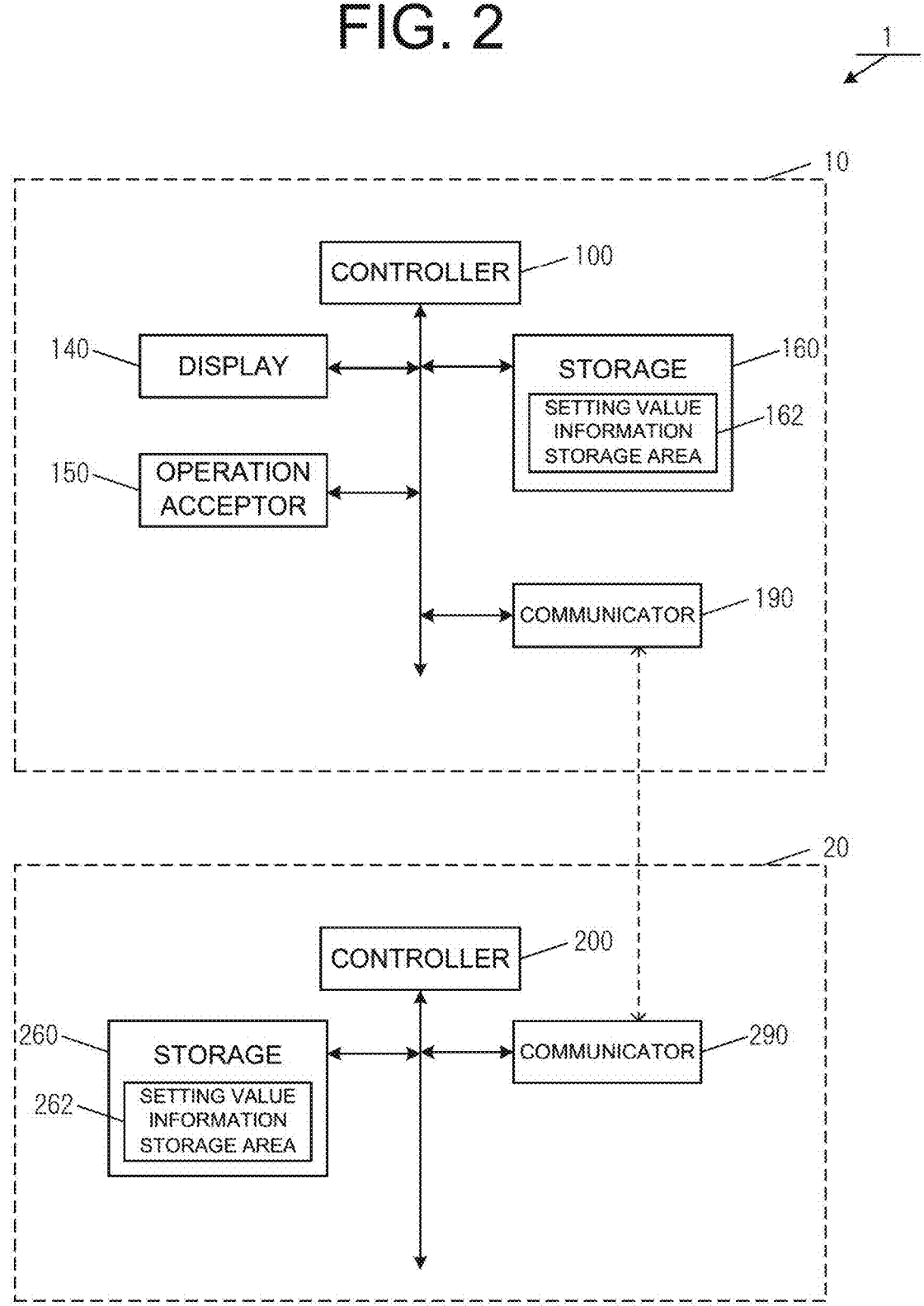
FIG. 2 is a diagram for illustrating functional configurations of a terminal device and a server device according to the first embodiment.

A functional configuration of the terminal device 10 will be described with reference to FIG. 2. The terminal device 10 includes a controller 100, a display 140, an operation acceptor 150, a storage 160, and a communicator 190 as illustrated in FIG. 2.

The controller 100 is a functional part that performs overall control of the terminal device 10. The controller 100 reads and executes various programs stored in the storage 160 to implement various functions, and includes, for example, one or more computing devices (central processing unit (CPU)).

The display 140 displays various types of information. The display 140 includes, for example, a display device such as a liquid crystal display (LCD), an organic electro-luminescence (EL) panel, or a micro-light emitting diode (LED) display.

The operation acceptor 150 receives an operation from the user who is using the terminal device 10. The operation acceptor 150 includes an input device such as a touch sensor. The touch sensor may detect an input by a general detection method such as a resistive method, an infrared method, an inductive method, or a capacitive method. The terminal device 10 may alternatively include the display 140 and the operation acceptor 150 unified as a touch panel.

The storage 160 stores various types of data and various types of programs necessary for operation of the terminal device 10. The storage 160 includes, for example, a storage device such as a solid state drive (SSD), which is semiconductor memory, or a hard disk drive (HDD).

A setting value information storage area 162 is reserved in the storage 160. Setting value information stored in the terminal device 10 indicates setting information (setting values) for each communication destination. The setting value information stored in the terminal device 10 includes server identifiers and setting information as shown in FIG. 3.

The server identifiers are each information that identifies a communication destination device (for example, the server device 20), and information indicating, for example, a communication protocol and a port number to be used for communication with the communication destination device. The setting value information in the case of communication with the server device 20 includes the following.

Address of the Server Device 20

The address of the server device 20 is information of an address for identifying the server device 20 and includes, for example, an Internet Protocol (IP) address and a uniform resource identifier (URI).

Protocol

The protocol is information for identifying a communication protocol usable for communication between the terminal device 10 and the server device 20 (communication protocol selectable by the terminal device 10). As the protocol, for example, information such as "h3" indicating that HTTP/3 is selectable as a communication protocol is stored. Information indicating a communication protocol is also referred to as a token.

Port

The port is information of a port to be used for communication with the server device 20. In a case where the Internet protocol suite is used for communication with the server device 20, for example, a port number and a communication protocol at the transport layer (transport layer network protocol) are stored as port information. The communication protocol at the transport layer is, for example, Transmission Control Protocol (TCP) or User Datagram Protocol (UDP). In this case, information such as "430/UDP" is stored as port information.

Note that information such as "100.200.100.24:3005 TCP", which is a combination of the IP address indicating the address of the server device 20 and port information, may be stored as a server identifier.

The setting information contains, for example, the last access time (date and time), information about the service provided by the server device 20, content of a SETTINGS FRAME received from the server device 20, and information indicating whether or not exchange of setting values (SETTINGS FRAMES) is skippable. Note that information other than the information described above may be contained in the setting information. For example, the setting information may contain information such as a Transport Layer Security (TLS) session ID, a TLS session ticket, or a TLS session key.

The communicator 190 performs communication with an external device such as the server device 20 via a local area network (LAN) or a wide area network (WAN). The communicator 190 includes, for example, a network interface card (NIC) to be used for a wired/wireless LAN and a communication module connectable to Long-Term Evolution (LTE)/LTE-Advanced (LTE-A)/License-Assisted Access (LAA) using LTE)/5G line.

1.2.2 Server Device

A functional configuration of the server device 20 will be described with reference to FIG. 2. The server device 20 includes a controller 200, a storage 260, and a communicator 290 as illustrated in FIG. 2.

The controller 200 is a functional part that performs overall control of the server device 20. The controller 200 reads and executes various programs stored in the storage 260 to implement various functions, and includes, for example, one or more computing devices (central processing unit (CPU)).

The storage 260 stores various types of data and various types of programs necessary for operation of the server device 20. The storage 260 includes, for example, a storage device such as an SSD, which is semiconductor memory, or an HDD.

A setting value information storage area 262 is reserved in the storage 260. Setting value information that is stored in the server device 20 indicates setting information for each communication partner device (for example, the terminal device 10). The setting value information stored in the server device 20 includes an identifier for identifying the terminal device 10 and setting information of the terminal device 10 (for example, content of a SETTINGS FRAME received from the terminal device 10). Note that as the identifier of the terminal device 10, for example, information to be used in a TLS session resumption process is stored in the server device 20. In this case, a TLS session key, a TLS session ticket, and other information usable for TLS session resumption are stored as the identifier of the terminal device 10.

The communicator 290 performs communication with the terminal device 10 and other devices. For example, the communicator 290 includes a communication device such as an NIC to be used for a wired/wireless LAN and a communication module, and performs communication with an external device via a LAN or a WAN.

The configurations of the devices described above are merely examples and may be altered. For example, each device may include a chip (System-on-a-chip; SoC) that integrates the controller and the communicator.

1.3 Flow of Processing

The following describes processing to be performed by the terminal device 10 and the server device 20 included in the system 1. The terminal device 10 performs the processing through the controller 100 reading a program stored in the storage 160. The server device 20 performs the processing through the controller 200 reading a program stored in the storage 260.

The description given below is based on an example in which communication between the terminal device 10 and the server device 20 is transmission and reception of data or the like that is transmitted to display a Web page in a Web browser or the like.

The description given below is also based on an example in which the terminal device 10 can select any of the following communication protocols for communication with the server device 20: HTTP/3, HTTP/2, and HTTP 1.1. Note here that HTTP/3, HTTP/2 and HTTP/1.1 are communication protocols for transferring data transmitted to display a web page in a web browser or the like. HTTP/3, HTTP/2 and HTTP/1.1 are communication protocols at the application layer of the Internet protocol suite. The data transmitted to display a Web page in a Web browser or the like is, for example, content data such as HyperText Markup Language (HTML) data, image data, Cascading Style Sheets (CSS) data, or script data. The server device 20 can use (hosts) one or more of the HTTP/3, HTTP/2, and HTTP 1.1 as communication protocols.

The description given below is also based on an example in which the server device 20 is a communication destination device for the terminal device 10.

1.3.1 Terminal Device 1.3.1.1 Main Processing

A flow of main processing to be performed by the terminal device 10 will be described with reference to FIG. 4. First, the controller 100 acquires an identifier (Step S100). The identifier is information for identifying the server device 20 to be a communication destination. The identifier is, for example, a URI, an IP address, a port (a port number or a transport layer communication protocol), or a session-ID.

Next, the controller 100 determines whether or not the terminal device 10 lacks setting value information of the server device 20 to be the communication destination (Step S102). For example, the controller 100 determines that the terminal device 10 contains the setting value information if setting value information including a server identifier corresponding to the identifier of the server device 20 acquired in Step S100 is stored in the setting value information storage area 162.

The terminal device 10 lacking setting value information means, for example, that the terminal device 10 is connected to the server device 20 corresponding to the identifier acquired in Step S100 for the first time, or that the setting value information has been deleted or expired. Setting value information being expired means that an expiration date is contained in setting information included in the setting value information, and the setting value information has passed the expiration date.

If the terminal device 10 lacks the setting value information, the controller 100 determines whether or not a protocol schema acquired is Transport Layer Security (TLS) (Yes in Step S102-->Step S104).

The protocol schema is information that indicates the type of communication, and examples thereof include HyperText Transfer Protocol (HTTP) and Hypertext Transfer Protocol Secure (HTTPS). The controller 100 acquires the protocol schema from information contained in the identifier (for example, URI) acquired in Step S100. The controller 100 determines that the protocol schema acquired is TLS if the protocol schema indicates communication using a TLS protocol.

If the protocol schema is TLS, the controller 100 performs first connection processing (Yes in Step S104-->Step S106). If the protocol schema is not TLS, the controller 100 performs second connection processing (No in Step S104-->Step S108). The first connection processing and the second connection processing will be described below.

Upon determining in Step S102 that the terminal device 10 contains the setting value information, the controller 100 determines whether or not the server identifier included in the setting value information contains information indicating HTTP/3 as protocol information (No in Step S102-->Step S110). The server identifier containing information indicating HTTP/3 (for example, a token such as "h3") means that the server device 20 to be the communication destination hosts HTTP/3, and HTTP/3 (first communication protocol) is usable as the communication protocol.

If the server identifier contains information indicating HTTP/3, the controller 100 performs first reconnection processing (Yes in Step S110-->Step S112). If the server identifier does not contain information indicating HTTP/3, the controller 100 performs second reconnection processing (No in Step S110-->Step S114). The first reconnection processing and the second reconnection processing will be described below.

1.3.1.2 First Connection Processing

The first connection processing will be described with reference to FIG. 5. The first connection processing is performed to establish a connection for secure communication between devices (the terminal device 10 and the server device 20) that communicate with each other. First, the controller 100 starts processes for respectively establishing two connections, a QUIC connection and a TLS over TCP connection (Step S200). The two connections in the present embodiment are referred to as a QUIC connection and a TLS over TCP connection. The term "connection" in the present embodiment refers to a logical communication path for communication between two devices (for example, the terminal device 10 and the server device 20).

The QUIC connection is a connection (first connection) for using HTTP/3 (first communication protocol). In the QUIC connection, QUIC is used as a protocol for establishing a connection and enabling communication over the established connection. QUIC is a communication protocol at the transport layer in the Internet protocol suite.

The TLS over TCP connection is a connection (second connection) for using HTTP/2 (second communication protocol) and for enabling secure communication. In the TLS over TCP connection, as protocols for establishing a connection and enabling communication over the established connection, TCP is used for establishing a connection (TCP connection) and TLS is used for enabling secure communication.

The TLS over TCP connection is a secure TCP connection. In the present embodiment, therefore, the TLS over TCP connection is also referred to as a TCP connection. TCP is a communication protocol at the transport layer in the Internet protocol suite.

Note here that HTTP/2 and HTTP/3 are communication protocols for HTTP communication. HTTP/3 is a relatively more advanced version of communication protocol than HTTP/2, and HTTP/2 is a relatively less advanced version of communication protocol than HTTP/3. HTTP/3 is a communication protocol obtained by improving the communication method in HTTP/2.

The TCP connection, which is a connection for using HTTP/2, adopts TCP for data (packet) communication. TCP allows implementation of packet sequencing. The packet sequencing allows a device receiving packets to correctly reconstruct data divided by the packets. On the other hand, the packet sequencing can cause packet retransmission if packet loss occurs, for example. In a poor communication environment such as a wide area wireless communication environment for mobile or the like, in particular, packet retransmission is likely due to packet jitter or corruption, resulting in a decrease in communication speed. Such a retransmission problem in TCP is also referred to as a head-of-line (HoL) blocking problem. In TCP, a connection for data (segment) communication is established through a three-way handshake with a communication destination. As described above, TCP ensures the reliability of communication through implementation of the packet sequencing and the three-way handshake. However, a communication delay can occur in TCP due to the HoL problem and the three-way handshake for highly reliable communication. In other words, communication using TCP is slower than communication using UDP.

Furthermore, for enabling secure communication over the TCP connection, it is necessary to perform a process (for example, a TLS handshake) for enabling TLS communication (communication over the TLS over TCP connection) in addition to establishing the TCP connection. In order to achieve secure communication using HTTP/2, therefore, it is necessary to perform the process for establishing a connection (TCP connection) and the process for enabling the TLS communication.

The QUIC connection, which is a connection for using HTTP/3, adopts UDP for data (packet) communication. Unlike TCP, UDP does not involve packet sequencing. Consequently, UDP does not involve packet retransmission due to packet sequencing and is less likely to have the HoL problem. Furthermore, unlike TCP, UDP does not involve a three-way handshake. As described above, UDP does not ensure the reliability of communication as well as TCP does. However, the use of UDP enables communication through a simplified process. Communication using UDP is therefore faster than communication using TCP. Note that in the case of the QUIC connection, a QUIC protocol is used for assurance of packet arrival, assurance of packet sequence, and connection management.

Furthermore, the QUIC protocol is integrated with TLS 1.3, allowing the process for enabling secure communication (communication using the TLS protocol) to be performed in the process of establishing a connection. Therefore, secure communication using HTTP/3 is enabled as long as the process for establishing a connection (QUIC connection) is performed.

As described above, the QUIC connection, which is a connection using UDP, is different from the TCP connection using TCP in the procedure for establishing a connection between devices that communicate with each other, allowing for a decrease in the amount of packets to be transmitted and received when the connection is established. Furthermore, only establishing the QUIC connection enables secure communication. Furthermore, the QUIC connection allows for communication in which the HoL problem is less likely to occur. HTTP/3, which is a communication protocol using the QUIC connection, therefore has a higher communication speed than HTTP/2, which is a protocol using the TCP connection. In other words, HTTP/2 communication is slower than HTTP/3 communication.

The controller 100 starts the processes for respectively establishing the two connections, which are the QUIC connection and the TLS over TCP connection, in parallel. For example, the controller 100 may start the process for establishing the QUIC connection and the process for establishing the TLS over TCP connection substantially simultaneously. Note that the controller 100 may start the process for establishing the TLS over TCP connection after starting the process for establishing the QUIC connection.

For establishing the QUIC connection, the controller 100 connects to a default port (for example, 443/UDP) of the server device 20 that is used for communication using HTTP/3. The controller 100 determines that the QUIC connection has been established when a connection using QUIC has been successfully established.

For establishing the TLS over TCP connection, the controller 100 connects to a default port (for example, 443/TCP) of the server device 20 that is used for communication using HTTP/2. The controller 100 determines that the TLS over TCP connection has been established when Application-Layer Protocol Negotiation (ALPN) for TLS has been successfully completed.

Next, the controller 100 determines whether or not the QUIC connection has been established (Step S202). For example, the controller 100 determines that the QUIC connection has been established if:
 the QUIC connection is successfully established earlier than the TLS over TCP connection, or
 the QUIC connection is successfully established within a specific period of time after successful establishment of the TLS over TCP connection.

The specific period of time may be predetermined or may be set by the user. Communication using HTTP/3 (first communication protocol) over the QUIC connection is enabled even in a case where the QUIC connection is established later within the specific period of time, because the controller 100 determines that the QUIC connection has been successfully established even in such a case.

If the QUIC connection has been successfully established, the controller 100 terminates the TCP connection (Yes in Step S202-->Step S204).

Next, the controller 100 establishes a connection using HTTP/3 as the communication protocol (Step S206). That is, the controller 100 enables communication using HTTP/3 as the communication protocol. For example, in order to enable communication using HTTP/3 as the communication protocol, the controller 100 conducts a protocol negotiation with the server device 20 by specifying "h3" as a token in ALPN.

Next, the controller 100 proceeds with the SETTINGS FRAME exchange with the server device 20 to acquire the setting information of the server device 20 (Step S208).

Upon determining in Step S202 that the QUIC connection has not been successfully established, the controller 100 terminates the QUIC connection (No in Step S202-->Step S210). The QUIC connection not being successfully established means, for example, that the controller 100 has failed to connect to the default port of the server device 20 that is used for communication using HTTP/3, or that the controller 100 has failed to complete this connection within a specific period of time.

In such a case, the controller 100 continues communication over the TLS over TCP connection provided that the TLS over TCP connection has been successfully established.

Next, the controller 100 determines whether or not an HTTP/2 connection, which in other words is communication using HTTP/2 as the communication protocol, is possible (Step S212). For example, the controller 100 specifies HTTP/2 (h2) and HTTP/1.1 (http/1.1) through ALPN. The controller 100 determines that communication using HTTP/2 is possible if HTTP/2 is selected by the server device 20. The controller 100 determines that communication using HTTP/2 is not possible if HTTP/1.1 is selected by the server device 20. The controller 100 then establishes a connection using the communication protocol selected by the server device 20 and starts communication.

Upon determining in Step S212 that communication using HTTP/2 is possible, the controller 100 acquires the setting information of the server device 20 through the SETTINGS FRAME exchange with the server device 20 (Yes in Step S212-->Step S214). Upon determining in Step S212 that communication using HTTP/2 is not possible, the controller 100 omits (skips) the process in Step S214 (No in Step S212).

The controller 100 stores the setting value information after performing the process in Step S208, after performing the process in Step S214, or after omitting the process in Step S214 (Step S216). For example, the controller 100 stores, in the setting value information storage area 162, the setting value information including the identifier acquired in Step S100 as the server identifier and including, as setting information, the content of the SETTINGS FRAME acquired from the communication destination server device 20. In this way, the controller 100 can store information on a communication protocol(s) and a port(s) usable for communication with a communication destination device (server device 20) identified by an URI and an IP address.

Note that the controller 100 performs the following process in Step S216.

- If both an HTTP/2 connection and an HTTP/3 connection are possible, the controller 100 stores both HTTP/2 and HTTP/3 as protocols usable for communication.
- If the server device 20 indicates that the same resource is obtained in a frame and a header (for example, Alt-Svc header/frame) with a different communication protocol/URI during communication, the controller 100 stores such indicated information.
- If the server device 20 indicates that setting is skippable (SETTINGS FRAME exchange is omittable), the controller 100 stores information indicating that setting is skippable. Note that the controller 100 determines that the server device 20 has indicated that setting is skippable if, for example, the controller 100 receives a specific frame indicative of such information from the server device 20. The controller 100 may determine that the server device 20 has indicated that setting is skippable if the controller 100 receives an extended SETTINGS FRAME (for example, a SETTINGS FRAME containing specific information) from the server device 20 or if a predetermined process is performed by the server device 20.
- If TLS communication is performed, the controller 100 stores information indicating that TLS communication has been performed.

The processes described above allow the controller 100 to start either HTTP/3 communication or HTTP/2 communication, and to store information on the protocol used for communication with the server device 20. Note that if neither the QUIC connection nor the TLS over TCP connection has been successfully established, the controller 100 may terminate the processing shown in FIG. 5 and display an error message on the display 140.

1.3.1.3 Second Connection Processing

The second connection processing will be described with reference to FIG. 6. The second connection processing is performed to establish a connection for plaintext communication between devices (the terminal device 10 and the server device 20) that communicate with each other. First, the controller 100 starts and establishes a TCP connection (connection using TCP as a communication protocol) with the server device 20 (Step S300). The controller 100 enables plaintext communication using TCP by establishing the TCP connection between the terminal device 10 and the server device 20. At the same time, the controller 100 also enables communication using HTTP/1.1 as a communication protocol.

Once the TCP connection has been established, the controller 100 transmits a communication protocol upgrade request to the server device 20 (Step S302). For example, the controller 100 transmits the upgrade request to the server device 20 using a switching protocol.

The controller 100 determines, based on a result of the process in Step S302, whether or not the communication protocol can be upgraded from HTTP/1.1 to HTTP/2 (whether or not an HTTP/2 connection is possible) (Step S304). For example, the controller 100 determines that an HTTP/2 connection is possible if the controller 100 receives information from the server device 20 indicating that the upgrade to HTTP/2 is possible.

If the HTTP/2 connection is possible, the controller 100 establishes an HTTP/2 clear text connection (communication using HTTP/2 clear text) between the terminal device 10 and the server device 20, and starts communication (Yes in Step S304-->Step S306). The controller 100 then proceeds with the SETTINGS FRAME exchange with the server device 20 (Step S308).

If the HTTP/2 connection is not possible, the controller 100 establishes an HTTP/1.1 clear text connection (communication using HTTP/1.1 clear text) between the terminal device 10 and the server device 20, and starts communication (No in Step S304-->Step S310). In this case, the controller 100 omits (skips) the SETTINGS FRAME exchange.

As described above, the controller 100 can determine in Step S304 which of HTTP/1.1 or HTTP/2 is usable as the communication protocol for communication with the server device 20. If HTTP/2 is usable for communication with the server device 20, the controller 100 can change the protocol for use in the communication with the server device 20 from HTTP 1.1 to HTTP/2.

Next, the controller 100 stores setting value information (Step S312). The process in Step S312 is the same as the process in Step S216 in FIG. 5.

1.3.1.4 First Reconnection Processing

Figure 7:
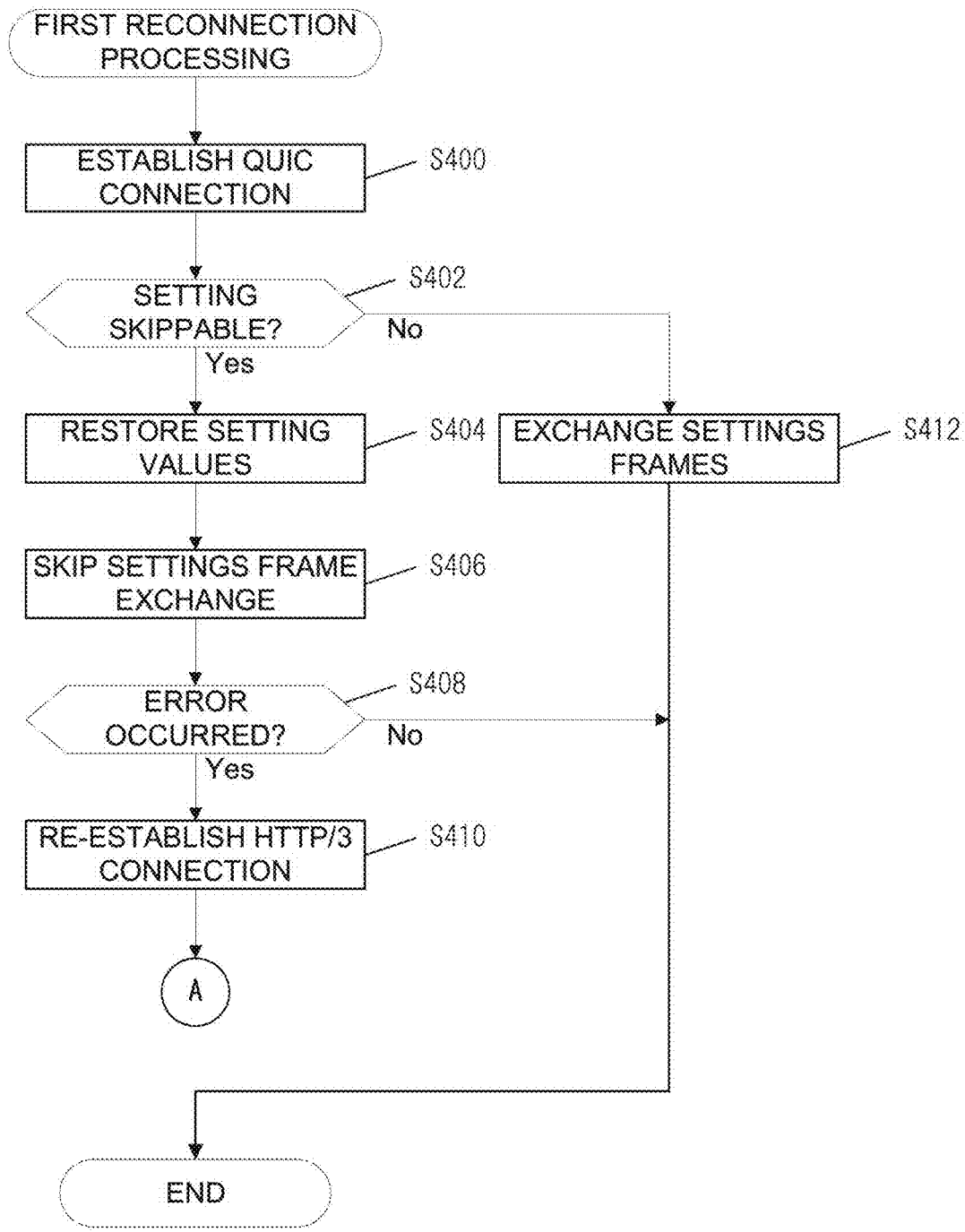
FIG. 7 is a flowchart for illustrating a flow of first reconnection processing according to the first embodiment.

The first reconnection processing will be described with reference to FIG. 7. First, the controller 100 establishes a QUIC connection (Step S400). Note here that the controller 100 has determined in Step S110 in FIG. 4 that the communication destination server device 20 hosts HTTP/3. The controller 100 can therefore start with establishing the QUIC connection, omitting the process for establishing a TLS over TCP connection. Since the process for establishing a TLS over TCP connection is omittable, the controller 100 can efficiently resume communication using HTTP/3. As described above, the controller 100 seeking communication with the communication destination server device 20 proceeds with the communication using HTTP/3 if HTTP/3 (first protocol) is stored as a communication protocol usable for communication with the communication destination server device 20.

Next, the controller 100 determines whether or not setting is skippable (Step S402). For example, the controller 100 acquires setting value information including a server identifier corresponding to the identifier of the server device 20 acquired in Step S100. The controller 100 determines that setting is skippable if the acquired setting value information contains information indicating that setting is skippable.

The controller 100 restores the setting values if settings is skippable (Yes in Step S402-->Step S404). For example, the controller 100 reads the setting information contained in the setting value information acquired in Step S402 to acquire the content of a SETTINGS FRAME, reproduces the state that was produced after the reception of the SETTINGS FRAME, and then starts communication with the server device 20. In this case, the controller 100 skips the SETTINGS FRAME exchange with the server device 20 (Step S406).

Upon occurrence of an error as a result of omitting the SETTINGS FRAME exchange, the controller 100 re-establishes the connection for HTTP/3 (Yes in Step S408-->Step S410). The occurrence of an error means, for example, that the controller 100 receives an error from the communication destination server device 20. In this case, the controller 100 re-establishes the connection for HTTP/3 by transmitting and receiving necessary information for communication using HTTP/3 to and from the server device 20. At the same time, the controller 100 adds information indicating that setting is not skippable to the setting value information acquired in Step S402. Alternatively, the controller 100 may show that setting is not skippable by deleting, from the setting value information, the information indicating that setting is skippable.

Figure 5:
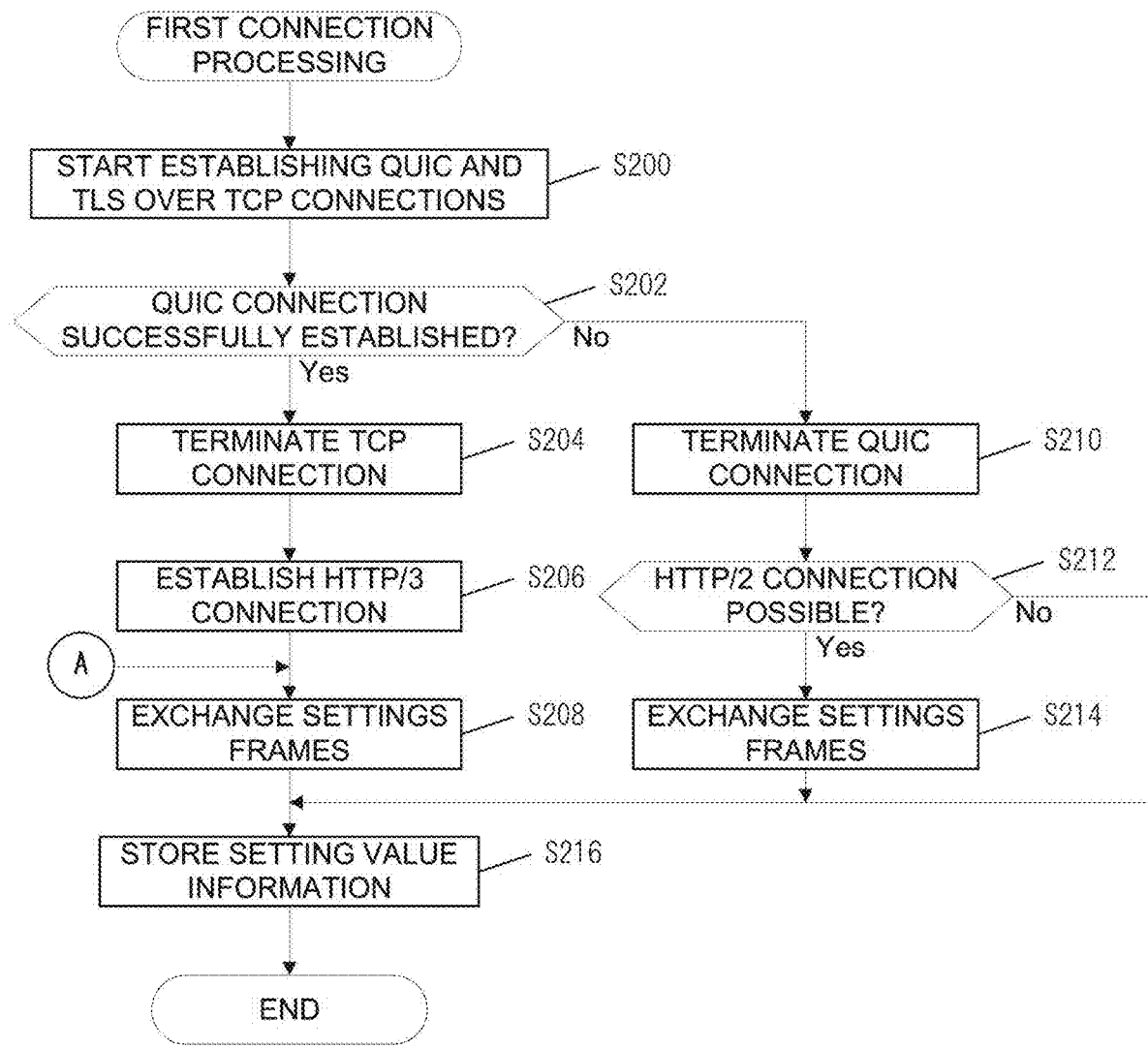
FIG. 5 is a flowchart for illustrating a flow of first connection processing according to the first embodiment.

The controller 100 proceeds with the SETTINGS FRAME exchange with the server device 20 by performing the process in Step S208 in FIG. 5.

Upon determining in Step S402 that setting is not skippable, the controller 100 proceeds with the SETTINGS FRAME exchange with the server device 20 (No in Step S402-->Step S412). In this case, the controller 100 employs the normal method to perform the process for the case where HTTP/3 is used as the communication protocol.

The processes described above allow the controller 100 to start communication using HTTP/3 as the communication protocol on condition that no error occurs as a result of skipping the SETTINGS FRAME exchange or on condition that SETTINGS FRAMES have been exchanged. The present embodiment makes reconnection to the server device 20 efficient because the controller 100 does not need to perform the process for establishing the TLS over TCP connection for the reconnection.

If HTTP/3 is not usable, such as when the establishment of the QUIC connection is unsuccessful in Step S400, the controller 100 promptly switches to communication using a communication protocol contained in the setting value information corresponding to the communication destination server device 20.

1.3.1.5 Second Reconnection Processing

Figure 8:
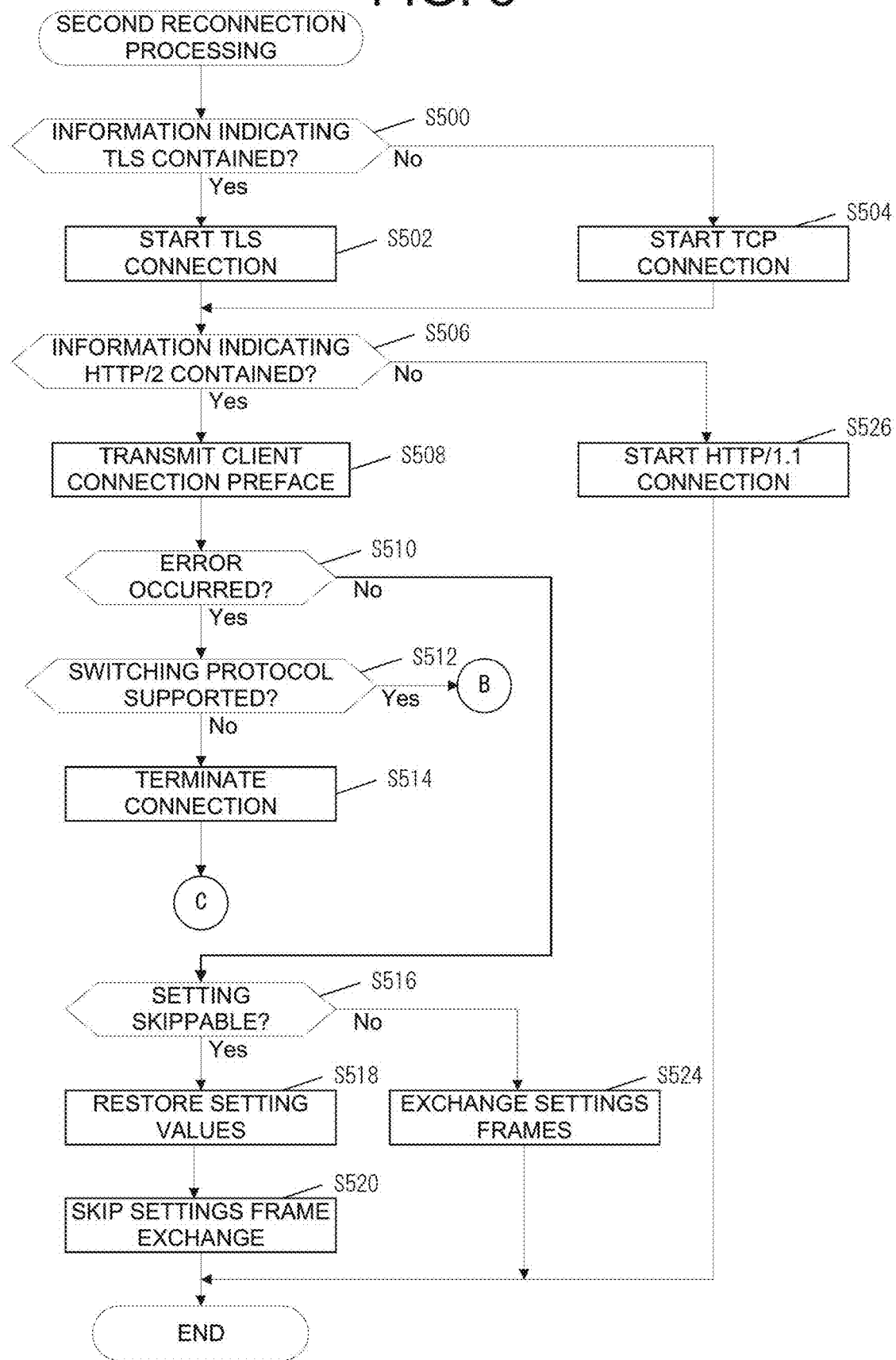
FIG. 8 is a flowchart for illustrating a flow of second reconnection processing according to the first embodiment.

The second reconnection processing will be described with reference to FIG. 8. First, the controller 100 determines whether or not the terminal device 10 contains information indicating that TLS communication with the server device 20 has been performed (Step S500). For example, the controller 100 may acquire setting value information including a server identifier corresponding to the identifier of the server device 20 acquired in Step S100, and determine whether or not the acquired setting value information contains information indicating that TLS communication has been performed.

If the terminal device 10 contains information indicating that TLS communication has been performed, the controller 100 starts a TLS connection to the server device 20 (Yes in Step S500-->Step S502). This means that the server device 20 does not host HTTP/3, and the protocol schema acquired indicates communication using a TLS protocol. The controller 100 starts a TCP connection to the server device 20 and conducts a negotiation for TLS through ALPN. As a result, the controller 100 can establish a TLS over TCP connection between the terminal device 10 and the server device 20.

If the terminal device 10 does not contain information indicating that TLS communication has been performed, the controller 100 starts a TCP connection (plaintext communication) to the server device 20 (No in Step S500-->Step S504). This means that the server device 20 does not host HTTP/3, and the protocol schema acquired does not indicate communication using a TLS protocol. If this is the case, the controller 100 does not conduct a negotiation for TLS through ALPN. As described above, the controller 100 can establish a TCP connection between the terminal device 10 and the server device 20.

Next, the controller 100 determines whether or not information indicating HTTP/2 is contained as protocol information in the server identifier included in the setting value information corresponding to the communication destination server device 20 (Step S506).

If information indicating HTTP/2 is contained, the controller 100 transmits a client connection preface to the server device 20 (Yes in Step S506-->Step S508). In this case, the controller 100 can proceed with communication using HTTP/2 in a direct mode through the process in Step S508, because the controller 100 can learn in advance that HTTP/2 is to be used as a communication protocol in the communication with the server device 20.

Upon occurrence of an error as a result of transmitting the client connection preface, the controller 100 determines whether or not the server device 20 supports a switching protocol (Yes in Step S510-->Step S512). The occurrence of an error means, for example, that the controller 100 receives an error from the communication destination server device 20.

Figure 6:
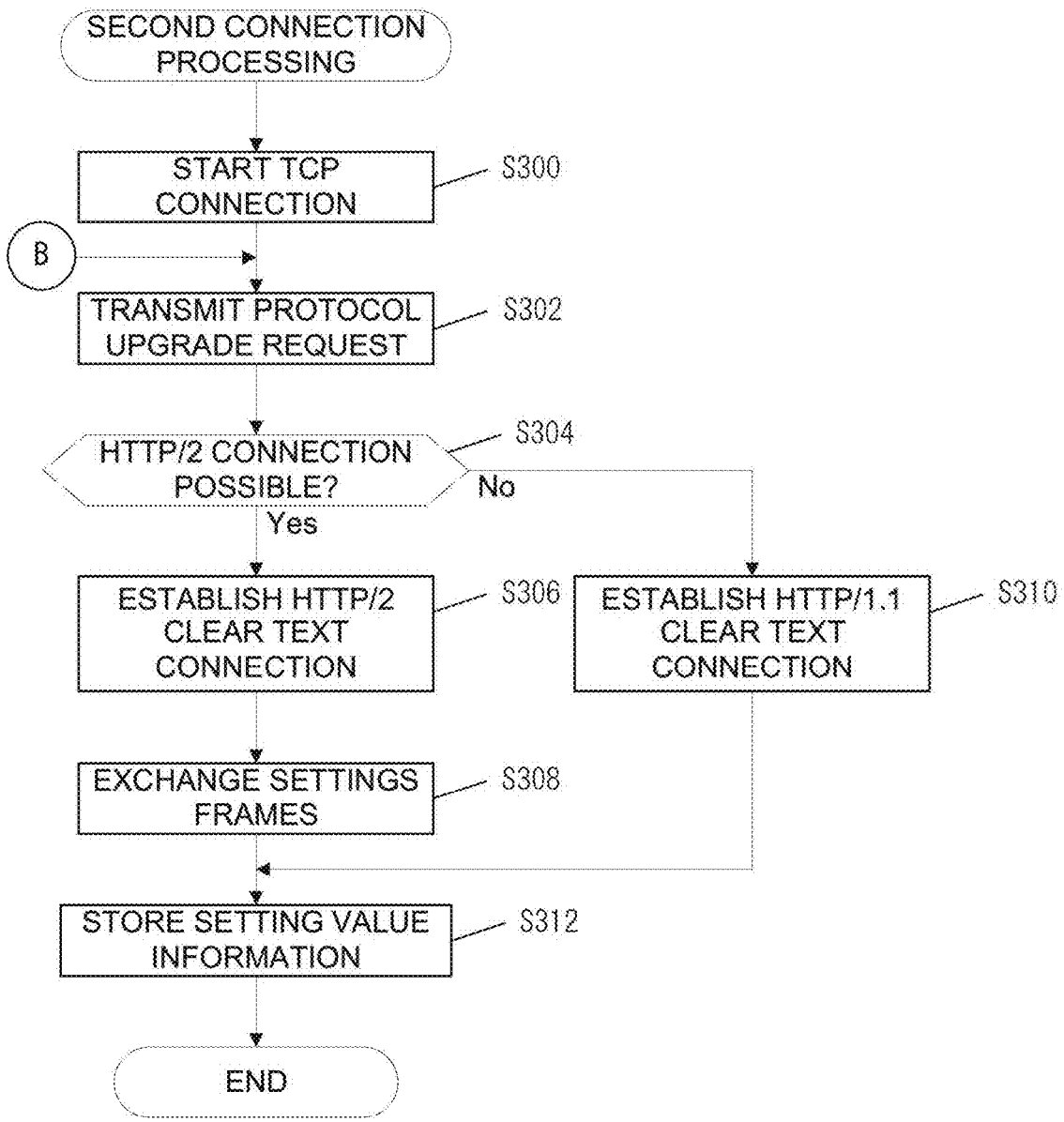
FIG. 6 is a flowchart for illustrating a flow of second connection processing according to the first embodiment.

If the server device 20 supports a switching protocol, the controller 100 performs the process in Step S302 in FIG. 6 (Yes in Step S512). Note that based on the result of the communication protocol upgrade process, the controller 100 adds the communication protocol usable for communication with the server device 20 to the setting value information.

If the server device 20 does not support a switching protocol, the controller 100 terminates the TLS connection or the TCP connection established through the process in Step S502 or Step S504 (No in Step S512-->Step S514). The controller 100 also deletes the setting value information corresponding to the server device 20 and performs the process in Step S104 in FIG. 4. In this case, the controller 100 proceeds with communication with the server device 20 in the same manner as in the case where the terminal device 10 lacks the setting value information.

Upon determining in Step S510 that no error has occurred, that is, if the communication of the client connection preface is successful, the controller 100 determines whether or not setting is skippable (No in Step S510-->Step S516).

If setting is skippable, the controller 100 restores the setting values (Yes in Step S516-->Step S518) and skips the SETTINGS FRAME exchange with the server device 20 (Step S520). If setting is not skippable, the controller 100 proceeds with the SETTINGS FRAME exchange with the server device 20 (No in Step S516-->Step S524). The processes in Step S516 to Step S524 are the same as the processes in Step S402 to Step S406 and Step S412 in FIG. 7.

Note that upon determining in Step S506 that the server identifier included in the setting value information does not contain information indicating HTTP/2 as protocol information, the controller 100 starts an HTTP/1.1 connection (communication using HTTP/1.1) (No in Step S506-->Step S526). In this case, the controller 100 can proceed with communication using HTTP/1.1 because the controller 100 can learn in advance that HTTP/1.1 is to be used as a communication protocol in the communication with the server device 20.

1.3.2 Server Device 1.3.2.1 Main Processing

Figure 9:
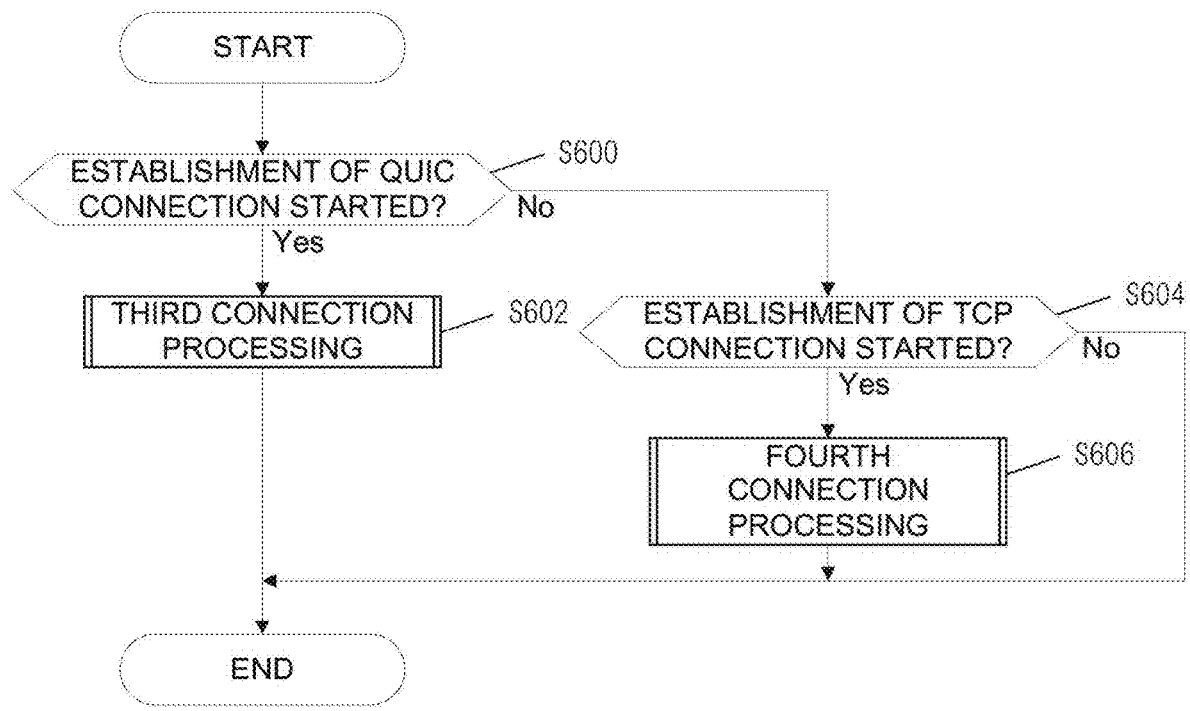
FIG. 9 is a flowchart for illustrating a flow of processing to be performed by the server device according to the first embodiment.

Next, a flow of main processing to be performed by the server device 20 will be described with reference to FIG. 9. The controller 200 of the server device 20 repeats the processing shown in FIG. 9. In this way, the server device 20 waits for establishment of a connection from the terminal device 10.

First, upon detecting the process for establishing a QUIC connection being started by the terminal device 10, the controller 200 performs third connection processing (Yes in Step S600-->Step S602).

Upon detecting the process for establishing a TCP connection being started, without detecting the process for establishing a QUIC connection being started, the controller 200 performs fourth connection processing (No in Step S600-->Yes in Step S604-->Step S606). The third connection processing and the fourth connection processing will be described below. If the controller 200 does not detect the process for establishing a TCP connection being started, the controller 200 ends the processing shown in FIG. 9 (No in Step S604).

1.3.2.2 Third Connection Processing

Figure 10:
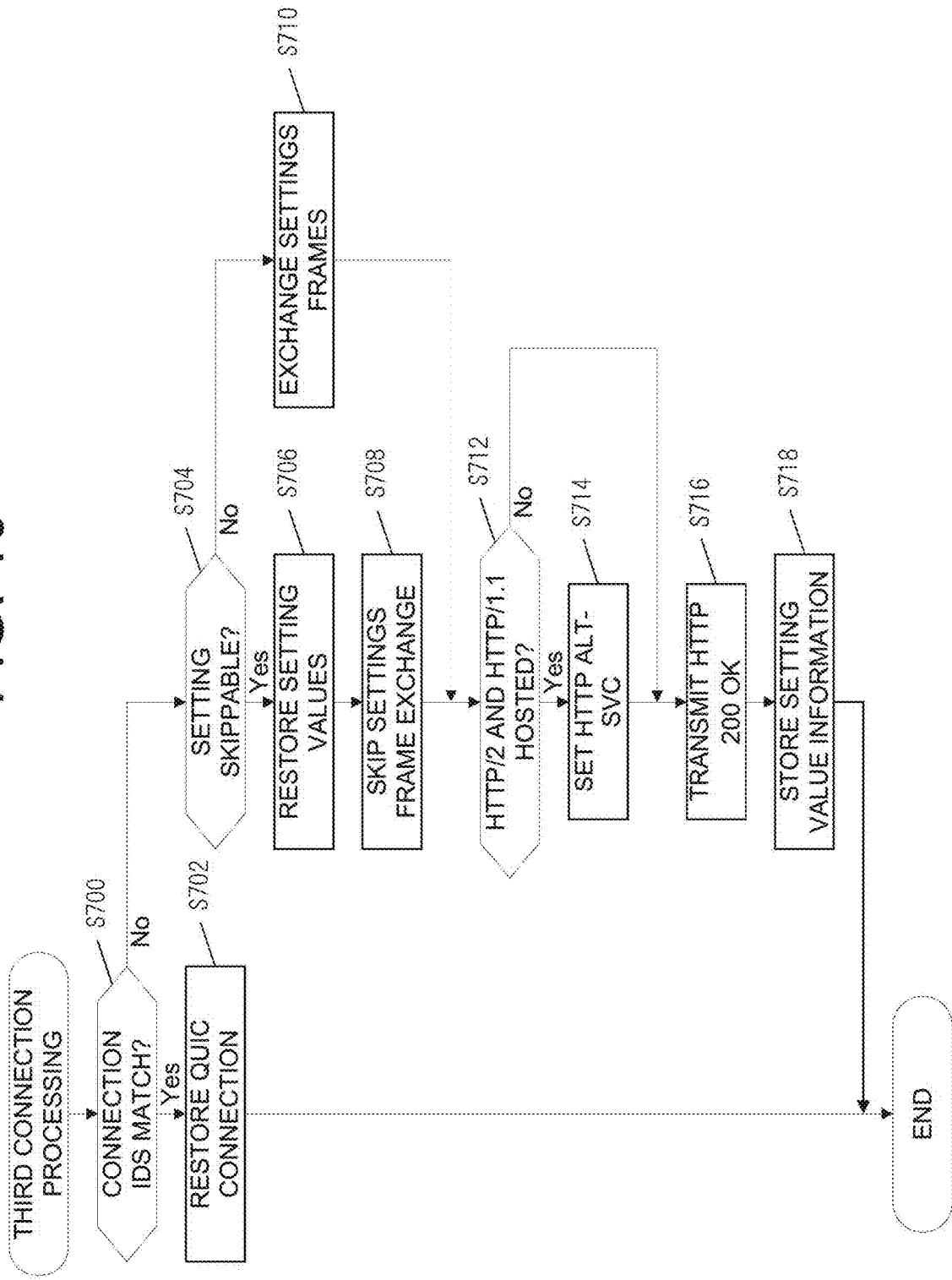
FIG. 10 is a flowchart for illustrating a flow of third connection processing according to the first embodiment.

The third connection processing will be described with reference to FIG. 10. Once the establishment of the QUIC connection has started, the controller 200 determines whether or not the connection ID of this connection matches the connection ID of any QUIC connection that has not yet been terminated (Step S700). If the connection IDs match, the controller 200 restores this not-yet-terminated QUIC connection matching the connection ID (Yes in Step S700-->Step S702).

If the connection IDs do not match (No in Step S700), controller 200 determines that an attempt to establish a new QUIC connection has been received. In this case, the controller 200 determines whether or not setting is skippable both at the server device 20 and at the terminal device 10 attempting to establish the QUIC connection to be a communication partner (Step S704). If setting is skippable, the controller 200 restores the setting values (Yes in Step S704-->Step S706) and skips the SETTINGS FRAME exchange with the terminal device 10 (Step S708). For example, the controller 200 reads, from the setting value information storage area 262, setting value information corresponding to the communication partner terminal device 10 and acquires, from the read setting value information, SETTINGS FRAME information received from the terminal device 10. The controller 200 then reproduces the state that was produced after the reception of the SETTINGS FRAME information acquired and starts communication with the terminal device 10.

If setting is not skippable, the controller 200 proceeds with the SETTINGS FRAME exchange with the terminal device 10 (No in Step S704-->Step S710).

Next, the controller 200 determines whether or not the server device 20 hosts HTTP/2 and HTTP/1.1 (Step S712). If the server device 20 hosts one or both of HTTP/2 and HTTP 1.1, the controller 200 does Alt-Svc setting (Yes in Step S712-->Step S714). The Alt-Svc setting refers to setting for the server device 20 to indicate to the terminal device 10 an origin, a protocol, and the like hosted by the server device 20. For example, the controller 200 does setting for including information of ports and tokens (for example, "h2","h2c", "http 1.1") indicating hosted communication protocols in an Alt-Svc header and setting for transmitting an Alt-Svc frame. Note that if the server device 20 hosts neither HTTP/2 nor HTTP/1.1, the controller 200 omits (skips) the process in Step S714 (No in Step S712). The controller 200 may also perform in Step S714 a process for indicating to the terminal device 10 an origin (origin server) and server configuration-related settings.

Next, the controller 200 transmits an HTTP response (HTTP 200 OK) to the terminal device 10 (Step S716). In Step S716, data in which the Alt-Svc header is set as the header of the HTTP response and the Alt-Svc frame are transmitted if the controller 200 has performed the process in Step S714. As a result of receiving such an HTTP response, the terminal device 10 can learn that the server device 20 hosts either or both of HTTP/2 and HTTP/1.1.

The controller 200 also stores setting value information (Step S718). For example, the controller 200 stores, in the setting value information storage area 262, setting value information including the identifier of the communication partner terminal device 10 and including, as setting information, the content of the SETTINGS FRAME acquired from the terminal device 10.

1.3.2.3 Fourth Connection Processing

Figure 11:
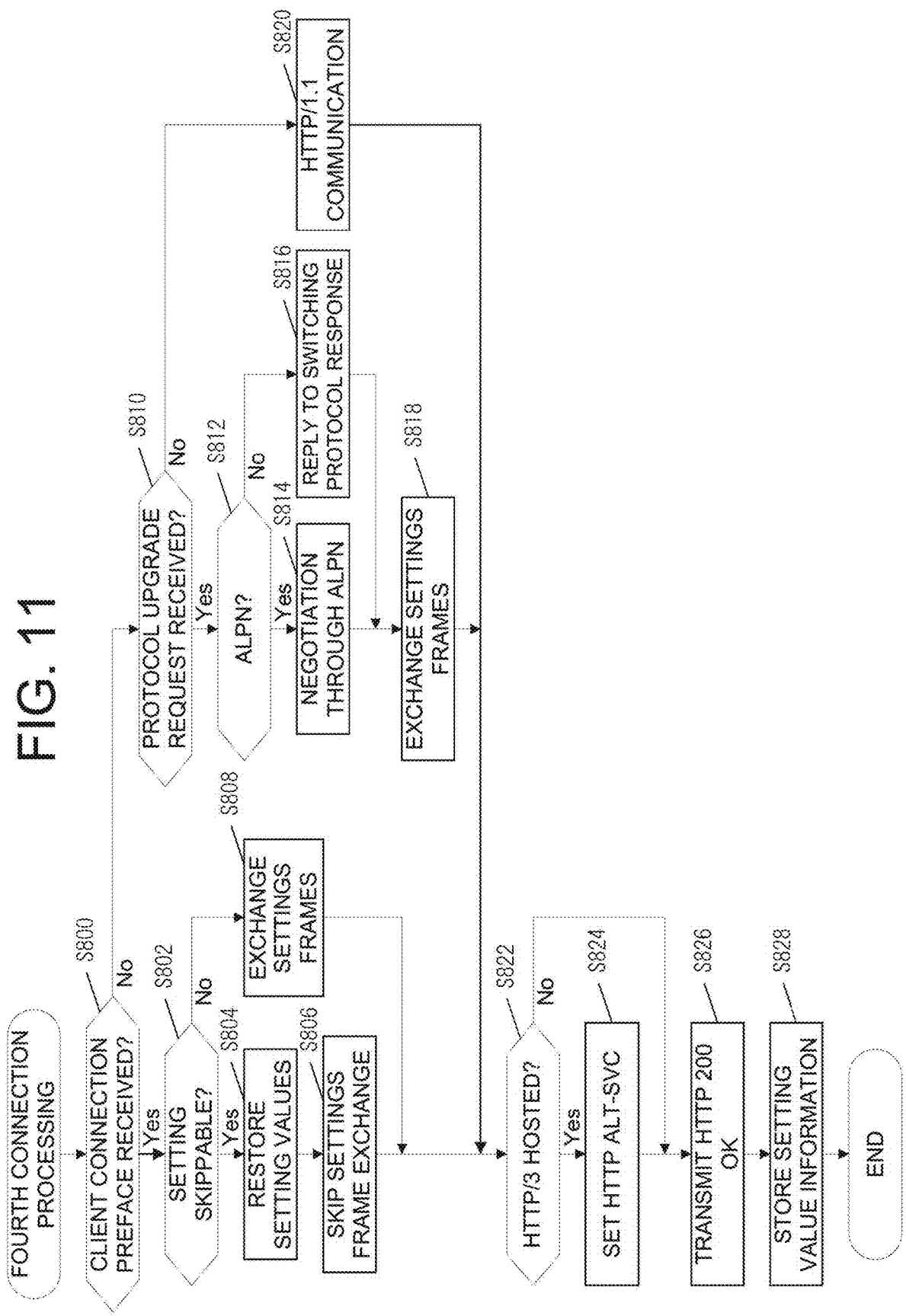
FIG. 11 is a flowchart for illustrating a flow of fourth connection processing according to the first embodiment.

The fourth connection processing will be described with reference to FIG. 11. The controller 200 determines whether or not a client connection preface has been received from the terminal device 10 (Step S800).

If a client connection preface has been received, the controller 200 determines whether or not setting is skippable both at the server device 20 and at the communication partner terminal device 10 (Yes in Step S800-->Step S802). If setting is skippable, the controller 200 restores the setting values (Yes in Step S802-->Step S804) and skips the SETTINGS FRAME exchange with the terminal device 10 (Step S806). If setting is not skippable, the controller 200 proceeds with the SETTINGS FRAME exchange with the terminal device 10 (No in Step S802-->Step S808). The processes in Step S802 to Step S808 are the same as the processes in Step S704 to Step S710 in FIG. 10.

If a client connection preface has not been received, the controller 200 determines whether or not a protocol upgrade request has been received from the terminal device 10 (No in Step S800-->Step S810).

If a protocol upgrade request has been received and the controller 200 is to proceed with a protocol upgrade through ALPN, the controller 200 accepts a negotiation with the terminal device 10 through ALPN (Yes in Step S812-->Step S814). If the controller 200 is not to proceed with a protocol upgrade through ALPN, the controller 200 proceeds with a protocol upgrade using a switching protocol (No in Step S812-->Step S816).

The controller 200 then proceeds with the SETTINGS FRAME exchange with the terminal device 10 (Step S818).

Note that upon determining in Step S810 that a protocol upgrade request has not been received, the controller 200 proceeds with communication with the terminal device 10 using HTTP 1.1 as the communication protocol (No in Step S810-->Step S820).

Next, if the server device 20 hosts HTTP/3, the controller 200 includes, in an Alt-Svc header, information of a port and a token (for example, "h3") indicating a communication protocol hosted by the server device 20 (Yes in Step S822-->Step S824). If the sever device 20 does not host HTTP/3, the controller 200 omits (skips) the process in Step S824 (No in Step S822).

Next, the controller 200 transmits an HTTP response (HTTP200 OK) to the terminal device 10 (Step S826). In Step S826, data in which the Alt-Svc header is set as the header of the HTTP response and the Alt-Svc frame are transmitted if the controller 200 has performed the process in Step S824. As a result of receiving such an HTTP response, the terminal device 10 can learn that the server device 20 hosts HTTP/3.

The controller 200 also stores setting value information (Step S828). Note that the processes in Step S820 to Step S826 are the same as the processes in Step S712 to Step S718 in FIG. 10.

1.4 Operation Example

Figure 12:
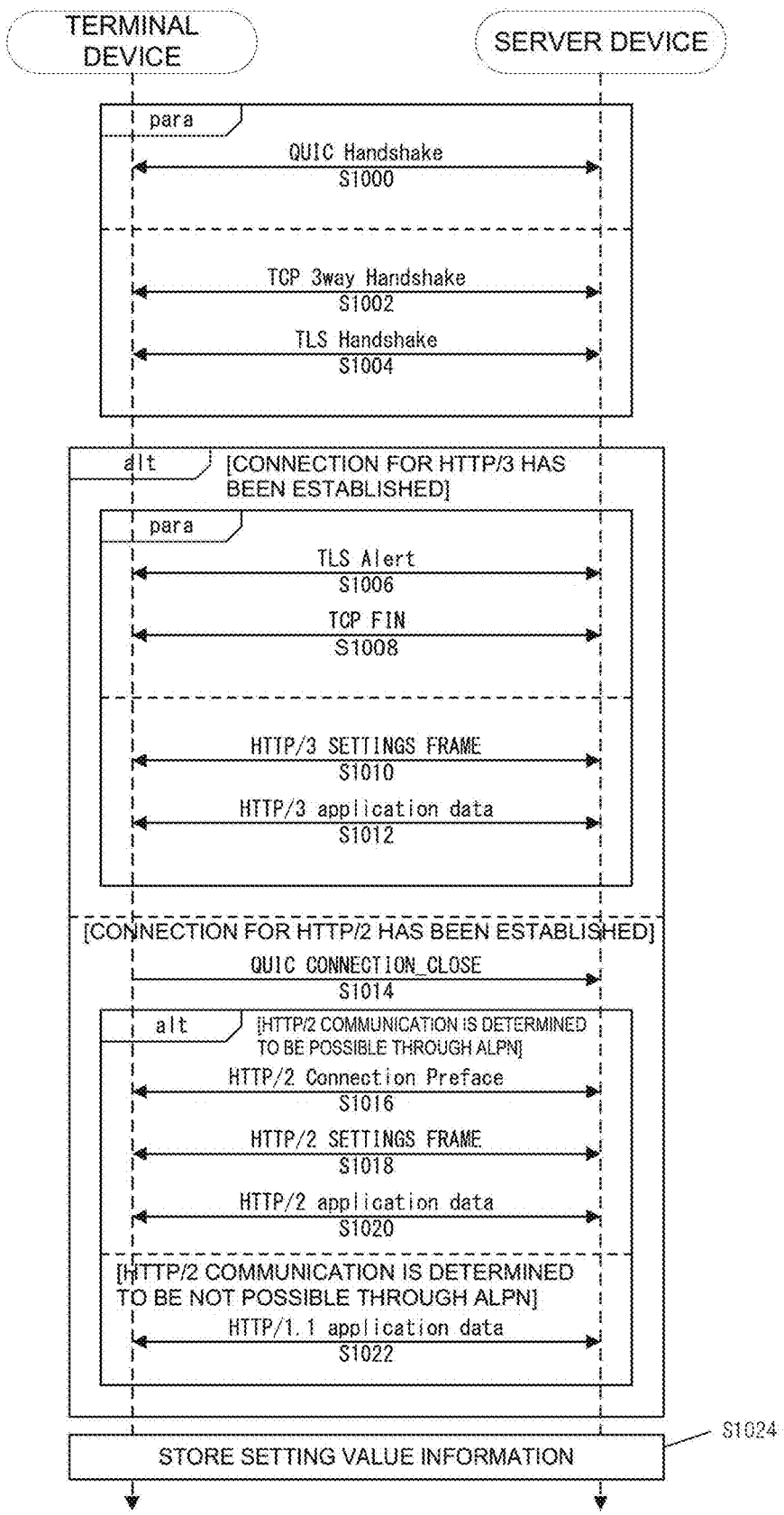
FIG. 12 is a diagram showing an example of operation according to the first embodiment.

Operation of the terminal device 10 and the server device 20 according to the present embodiment will be described with reference to FIGS. 12 and 13. FIG. 12 is a diagram showing a sequence of processes for the terminal device 10 to communicate with the server device 20 using a TLS protocol. The processes shown in FIG. 12 are performed in the case where the terminal device 10 lacks the setting value information corresponding to the communication destination server device 20.

First, the terminal device 10 starts the processes for respectively establishing a QUIC connection and a TCP connection. Specifically, the terminal device 10 and the server device 20 perform a QUIC handshake (S1000), a TCP three-way handshake (S1002), and a TLS handshake (S1004) in parallel. Since the TLS handshake is performed in parallel with the QUIC handshake in S1000, the round-trip time (RTT) for the establishment of the QUIC connection can be shorter than that for the establishment of the TLS over TCP connection.

If the connection for using HTTP/3 has been established (for example, if the connection for HTTP/3 is established earlier than the connection for HTTP/2), the terminal device 10 and the server device 20 terminate the TLS connection through transmission of a TLS alert (close_notify) (S1006) and terminate the TCP connection through transmission of an FIN packet (S1008). Through the processes described above, the TCP connection is terminated. Meanwhile, SETTINGS FRAMES are exchanged between the terminal device 10 and the server device 20 using HTTP/3 as the communication protocol (S1010). Furthermore, data (application data) is transmitted and received between the terminal device 10 and the server device 20 using HTTP/3 (S1012). The processes in S1006 and S1008 are performed in parallel with the processes in S1010 and S1012.

If the connection for using HTTP/2 has been established (for example, if the connection for HTTP/2 is established earlier than the connection for HTTP/3), the terminal device 10 transmits CONNECTION_CLOSE using a HANDSHAKE packet or an Initial packet to the server device 20 to terminate the QUIC connection (S1014). In this case, the terminal device 10 and the server device 20 communicate with each other using HTTP/1.1 or HTTP/2 as the communication protocol.

Upon the terminal device 10 determining that communication using HTTP/2 is possible through ALPN, a connection preface is transmitted and received (S1016), and SETTINGS FRAMES are exchanged (S1018) between the terminal device 10 and the server device 20. Furthermore, data (application data) is transmitted and received between the terminal device 10 and the server device 20 using HTTP/2 (S1020).

Upon the terminal device 10 determining that communication using HTTP/2 is not possible through ALPN, data (application data) is transmitted and received between the terminal device 10 and the server device 20 using HTTP/1.1 (S1022).

As described above, the terminal device 10 seeking communication with the server device 20 can select one of HTTP/3, HTTP/2, and HTTP/1.1 as the communication protocol to perform the communication with the server device 20. Setting value information including the communication protocol selected by the terminal device 10 for this communication and information notified by being included in the Alt-Svc header of the HTTP response received from the server device 20 is stored (S1024).

Figure 13:
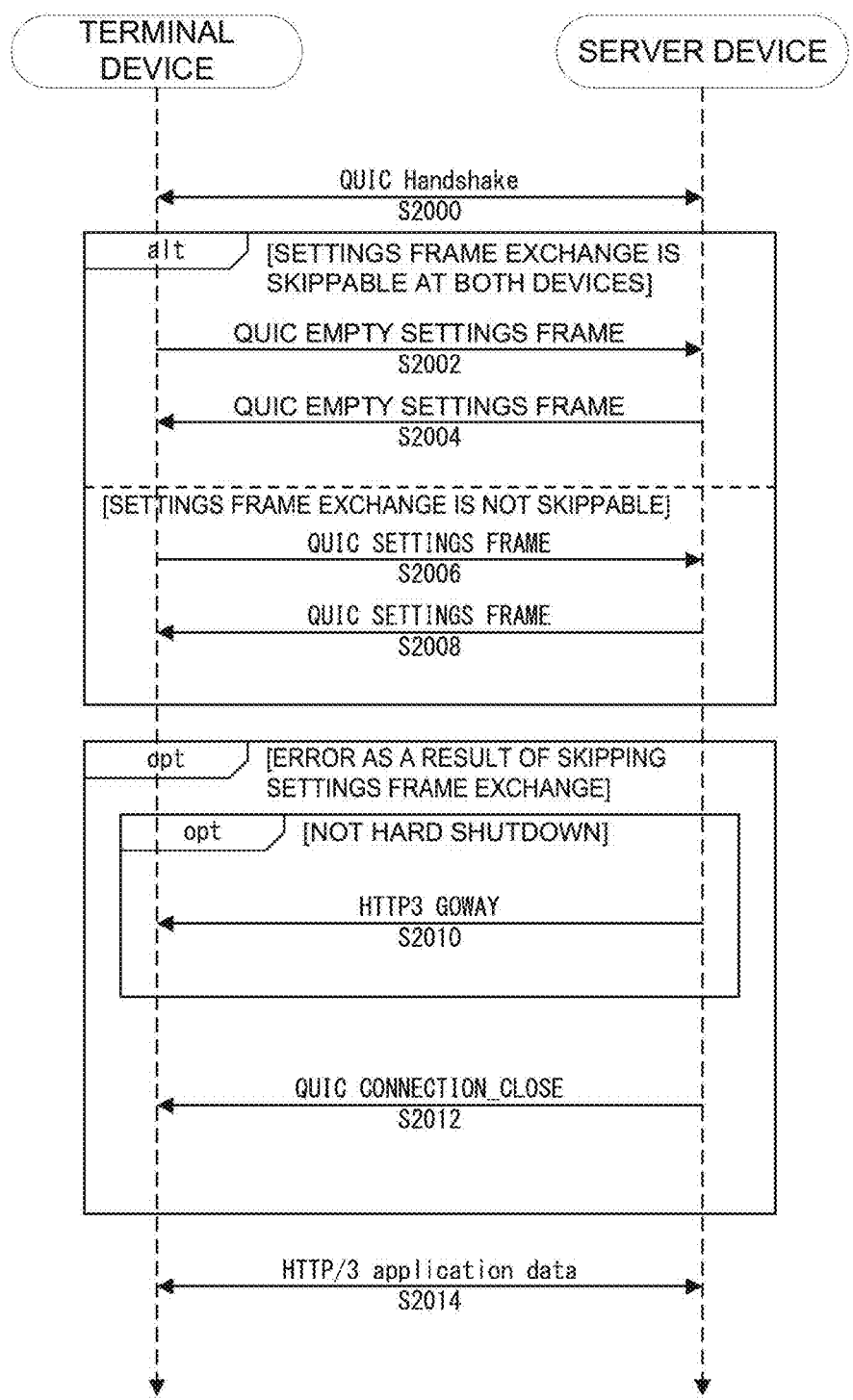
FIG. 13 is a diagram showing an example of operation according to the first embodiment.

FIG. 13 is a diagram showing a sequence of processes for the terminal device 10 to store setting value information corresponding to the communication destination server device 20 and to communicate with the communication destination server device 20 using HTTP/3 as the communication protocol.

First, the terminal device 10 and the server device 20 perform a QUIC handshake (S2000). Next, if the SETTINGS FRAME exchange is omittable both at the terminal device 10 and at the server device 20, the terminal device 10 transmits an empty SETTINGS FRAME (SETTINGS FRAME containing no specific data) to the server device 20 (S2002). The server device 20 also transmits an empty SETTINGS FRAME to the terminal device 10 (S2004).

Transmitting empty SETTINGS FRAMES allows the terminal device 10 and the server device 20 to determine that there is no change in the content (setting values) of the SETTINGS FRAMES. Upon receiving the empty SETTINGS FRAME from each other's communication partner, the terminal device 10 and the server device 20 each restore the content of the SETTINGS FRAME based on information contained in the setting value information corresponding to the communication partner.

Note that if there is a change in the setting values, a SETTINGS FRAME containing the change may be transmitted. In this case, the device that has received the SET- TINGS FRAME containing such specific information preferentially uses the thus received specific information as a setting value.

If the SETTINGS FRAME exchange between the terminal device 10 and the server device 20 is not omittable, the terminal device 10 transmits a SETTINGS FRAME containing data indicating setting values to the server device 20 (S2006). The server device 20 also transmits a SETTINGS FRAME containing data indicating setting values to the terminal device 10 (S2008).

Upon occurrence of an error as a result of omitting (skipping) the SETTINGS FRAME exchange, predetermined information is transmitted from the server device 20 to the terminal device 10. For example, in a case where the server device 20 selects a graceful shutdown, a GOWAY FRAME is transmitted from the server device 20 to the terminal device 10 (S2010). Furthermore, CONNECTION_CLOSE is transmitted from the server device 20 to the terminal device 10 (S2012). In a case where the server device 20 selects a hard shutdown, CONNECTION_CLOSE is transmitted from the server device 20 to the terminal device 10 without GOWAY FRAME being transmitted. When the connection is terminated by the server device 20 as described above, the terminal device 10 reconnects to the server device 20 by performing the processes in S1000 and S1010 shown in FIG. 12 for communication using HTTP/3.

If no error occurs as a result of omitting (skipping) the SETTINGS FRAME exchange, data (application data) is transmitted and received between the terminal device 10 and the server device 20 using HTTP/3 (S2014).

As described above, the terminal device according to the present embodiment can preferentially select HTTP/3 in an efficient manner out of HTTP/3 (first communication protocol), which has a higher communication speed, and HTTP/2 (second communication protocol), which has a lower communication speed.
(1) The terminal device uses HTTP/3 as the communication protocol if the connection (QUIC connection) for using HTTP/3 is successfully established.
(2) The terminal device uses HTTP/3 if the terminal device contains information (setting value information) indicating that HTTP/3 is to be used for communication with the communication destination server device.

The terminal device can therefore efficiently select HTTP/3 as a communication protocol to use for communication with another device such as the server device, even if three types of communication protocols, such as HTTP/1.1, HTTP/2, and HTTP/3, are selectable. This results in a reduction in the time required for the terminal device to start the communication. Furthermore, the terminal device preferentially selects and uses a communication protocol for a connection that offers a higher communication speed, such as a QUIC connection. This allows the terminal device to communicate with a communication destination device at high speed and suppresses a decrease in communication speed.

2. Second Embodiment

The following describes a second embodiment. According to the second embodiment, the communication protocol to be preferentially selected is changed depending on the terminal device.

Communication using HTTP/3 is faster than communication using HTTP/2 because the speed of the communication using HTTP/3 does not easily decrease even if packet loss occurs. In a wired connection, however, packet loss is less likely to occur, and the communication speed is less likely to significantly decrease even in the case of communication using HTTP/2.

For such a situation, the controller 100 switches the communication protocol to be preferentially selected depending on the communication environment of the terminal device 10 and the establishment order of connections. Specifically, the controller 100 performs the following process in Step S202.
(1) The controller 100 selects HTTP/2 as the communication protocol if a TLS over TCP connection is established earlier than a QUIC connection and the terminal device 10 is on a wired connection. Thus, the controller 100 proceeds with the communication with the server device 20 using HTTP/2.
(2) Otherwise, the controller 100 selects HTTP/3 as the communication protocol. Thus, the controller 100 proceeds with the communication with the server device 20 using HTTP/3.

The terminal device 10 being on a wired connection means that the communicator 190 is to perform communication over the wired connection, and the terminal device 10 is connected to a communication device such as a router by a transmission medium such as a LAN cable. For example, HTTP/2 is preferentially selected as the communication protocol in a case where the terminal device 10 is a desktop PC and is connected to another communication device by a transmission medium such as a LAN cable. By contrast, HTTP/3 is preferentially selected as the communication protocol in a case where the terminal device 10 is a laptop PC or a mobile PC and is connected to another communication device through a wireless connection.

As described above, if predetermined conditions are satisfied, that is, for example, if a TLS over TCP connection is established earlier than a QUIC connection, and the communication environment is providing a wired connection, the controller 100 preferentially selects HTTP/2 without waiting for the QUIC connection to be established. This allows the terminal device 10 to omit the processing for communication using HTTP/3, resulting in a reduction in the time required to start communication with the server device 20.

Note that the controller 100 may preferentially select HTTP/2 based on other conditions than the above-described conditions.

Furthermore, the controller 100 stores the information indicating that HTTP/3 is usable for communication with the communication destination server device 20 in Step S216. The controller 100 can therefore use HTTP/3 as the communication protocol for resumption of communication with the same server device 20.

As described above, according to the present embodiment, the communication protocol to be preferentially selected is changeable depending on the communication environment of the terminal device and the establishment order of connections.

3. Third Embodiment

The following describes a third embodiment. According to the third embodiment, key information is shared between communication protocols that adopt TLS in which key exchange is performed using symmetric-key cryptography.

A TLS protocol is used when a QUIC connection, which is a connection (first connection) for using HTTP/3 (first communication protocol), is established. When a QUIC connection is established, therefore, key information (information of a public key of the communication destination) is exchanged between the terminal device 10 and the server device 20.

A TLS protocol is used also when a TLS over TCP connection, which is a connection (second connection) for using HTTP/2 (second communication protocol), is established. When a TLS over TCP is established, therefore, key information (information of a public key of the communication destination) is exchanged between the terminal device 10 and the server device 20.

In the present embodiment, the terminal device 10 and the server device 20 store the key information received from each other's communication partner device when one of the first connection and the second connection is established between the terminal device 10 and the server device 20, and use the stored key information when the other connection is established therebetween. More specifically, the terminal device 10 and the server device 20 use key information shared between protocols (between QUIC/UDP-TCP) that adopt the same version of TLS, which is TLS 1.3 or a later version. This allows the terminal device 10 and the server device 20 to omit a negotiation process (for example, a TLS handshake) for connection encryption (encrypted connection) when switching, between HTTP/2 and HTTP/3, the communication protocol to be used.

As described above, according to the present embodiment, the terminal device and the server device can omit the process for connection encryption, resulting in a reduction in the time required to start the communication therebetween.

4. Modification Example

The present disclosure is not limited to the above-described embodiments, and various modifications may be made. That is, the technical scope of the present disclosure also includes embodiments that may be obtained by combining technical measures that are modified as appropriate without departing from the gist of the present disclosure. For example, the foregoing embodiments are described based on an example in which the communication between the terminal device and the server device is transmission and reception of data or the like that is transmitted to display a Web page in a Web browser or the like. However, the communication is not limited as such. That is, the processing described in association with the foregoing embodiments may be modified as appropriate to be applied to transmission and reception of data between the terminal device and the server device using any of the communication protocols HTTP/3, HTTP/2, and HTTP/1.1. For another example, the foregoing description is based on an example of HTTP communication in which HTTP/3 is a relatively more advanced version of communication protocol, and HTTP/2 is a relatively less advanced version of communication protocol. However, in a case where a newer version of HTTP communication protocol has been developed, the present disclosure is still applicable, taking the newer version of HTTP communication protocol as a more advanced communication protocol and any of existing HTTP communication protocols as a less advanced communication protocol.

Although some of the foregoing embodiments are described separately for convenience of explanation, it is needless to say that such embodiments may be combined and implemented within a technically allowable range. For example, the second embodiment and the third embodiment may be combined. In this case, the terminal device can achieve both the switching of the communication protocol to be preferentially selected and the sharing of key information.

The program that operates on each of the devices in the foregoing embodiments is a program that controls the CPU or the like (program that causes the computer to function) so as to implement the functions according to the foregoing embodiments. The information handled by these devices is temporarily accumulated in a temporary storage device (for example, RAM) during the processing, is then stored in various storage devices such as read only memory (ROM) and an HDD, and is read, corrected, and written by the CPU as needed.

Here, a recording medium that stores the program may be, for example, any of a semiconductor medium (for example, ROM and a non-volatile memory card), an optical recording medium/magneto-optical recording medium (for example, a digital versatile disk (DVD), a magneto optical disk (MO), a Mini Disk (MD), a compact disk (CD), and a Blu-ray (registered trademark) Disk (BD)), a magnetic recording medium (for example, a magnetic tape and a flexible disk). Furthermore, not only are the functions of the foregoing embodiments implemented through execution of the loaded program, but the functions of the present disclosure may also be implemented through processing performed in cooperation with, for example, an operating system or other application programs on the basis of instructions of the program.

For market distribution, the program may be stored and distributed in a portable recording medium or transferred to a server computer connected via a network such as the Internet. In this case, a storage device of the server computer is obviously included in the present disclosure.

What is claimed is:

1. A terminal device comprising:
a controller; and
a communicator that performs Hyper Text Transfer Protocol (HTTP) communication with a communication destination, wherein
the controller starts processes for respectively establishing, in parallel, a first connection to the communication destination by using HTTP/3 and a second connection to the communication destination by using HTTP/2, and proceeds with communication using the HTTP/3 through the communicator if the first connection is successfully established.

2. The terminal device according to claim 1, further comprising
a storage that stores the communication destination and a communication protocol usable for communication with the communication destination, wherein
the controller seeking communication with the communication destination proceeds with the communication with the communication destination using the HTTP/3 if the HTTP/3 is stored in the storage as the communication protocol usable for communication with the communication destination.

3. The terminal device according to claim 1, wherein upon the first connection and the second connection being successfully established, the controller proceeds with communication with the communication destination using the HTTP/2 if the second connection is established earlier than the first connection and the communicator is to perform communication over a wired connection, and otherwise proceeds with communication with the communication destination using the HTTP/3.

4. The terminal device according to claim 1, wherein when public-key cryptography is used in the first connection and the second connection and if the controller has acquired key information from the communication destination through one of the first connection and the second connection, the controller uses the key information when establishing the other of the first connection and the second connection with the communication destination.

5. A communication method for a terminal device to perform Hyper Text Transfer Protocol (HTTP) communication, the communication method comprising:
   starting processes for respectively establishing, in parallel, a first connection to the communication destination by using HTTP/3 and a second connection to the communication destination by using HTTP/2; and
   proceeding with communication using the HTTP/3 if the first connection is successfully established by the terminal device.

6. The communication method according to claim 5, wherein upon the first connection and the second connection being successfully established, the controller proceeds with communication with the communication destination using the HTTP/2 if the second connection is established earlier than the first connection and the communicator is to perform communication over a wired connection, and otherwise proceeds with communication with the communication destination using the HTTP/3.

7. A terminal device comprising:
   a controller; and
   a communicator, wherein
   the controller starts processes for respectively establishing, in parallel, a first connection to the communication destination by using a first communication protocol having a higher communication speed and a second connection to the communication destination by using a second communication protocol having a lower communication speed, and proceeds with communication using the first communication protocol through the communicator if the first connection is successfully established.

8. The terminal device according to claim 7, wherein upon the first connection and the second connection being successfully established, the controller proceeds with communication with the communication destination using the second communication protocol if the second connection is established earlier than the first connection and the communicator is to perform communication over a wired connection, and otherwise proceeds with communication with the communication destination using the first communication protocol.

\* \* \* \* \*